United States Patent
Park et al.

(10) Patent No.: US 8,584,170 B2
(45) Date of Patent: Nov. 12, 2013

(54) SYSTEM AND METHOD OF INTERNET GROUP MANAGEMENT FOR MULTICAST PUSH IN PASSIVE ACCESS NETWORKS

(75) Inventors: Sung-Kwon Park, Seoul (KR); Eun-Jo Lee, Seoul (KR)

(73) Assignee: IUCF-HYU (Industry Cooperation Foundation Hanyang University), Seoul (KR)

( * ) Notice: Subject to any disclaimer, the term of this patent is extended or adjusted under 35 U.S.C. 154(b) by 172 days.

(21) Appl. No.: 13/318,851

(22) PCT Filed: Oct. 22, 2009

(86) PCT No.: PCT/KR2009/006133
§ 371 (c)(1),
(2), (4) Date: Nov. 4, 2011

(87) PCT Pub. No.: WO2010/128739
PCT Pub. Date: Nov. 11, 2010

(65) Prior Publication Data
US 2012/0066720 A1    Mar. 15, 2012

(30) Foreign Application Priority Data
May 7, 2009    (KR) .................. 10-2009-0039658

(51) Int. Cl.
*G06F 3/00* (2006.01)
*H04B 3/20* (2006.01)
(52) U.S. Cl.
USPC .............................. 725/51; 370/390; 370/392
(58) Field of Classification Search
None
See application file for complete search history.

(56) References Cited

U.S. PATENT DOCUMENTS

| | | | |
|---|---|---|---|
| 7,983,262 B1* | 7/2011 | Bishara ..................... | 370/390 |
| 2002/0091926 A1* | 7/2002 | Fukutomi ................. | 713/170 |
| 2002/0120769 A1* | 8/2002 | Ammitzboell ............ | 709/238 |
| 2007/0274310 A1* | 11/2007 | Wei et al. ................. | 370/390 |
| 2008/0168507 A1* | 7/2008 | Teramoto et al. .......... | 725/74 |
| 2008/0247373 A1 | 10/2008 | Synnergren et al. | |
| 2009/0022154 A1* | 1/2009 | Kiribe et al. ............ | 370/390 |
| 2009/0316697 A1* | 12/2009 | Dakshinamoorthy et al. ....................... | 370/390 |

FOREIGN PATENT DOCUMENTS

EP    1739904 A1    3/2007

* cited by examiner

*Primary Examiner* — Oschta Montoya
(74) *Attorney, Agent, or Firm* — Marger, Johnson & McCollom, PC

(57) ABSTRACT

Disclosed is an Internet group management system of a push-type multicast in a passive access network, and a method thereof. The Internet group management system of a push-type multicast supporting Internet group management with respect to a packet stream simultaneously being transmitted to a subscriber accessing the same node via a passive access network where at least one subscriber accesses a single node, the system including an input packet classifying unit to sort a multimedia contents packet corresponding to a contents transmission packet from the packet stream, and a program managing unit to construct a broadcasting program table having information of the sorted multimedia contents packet, to determine, based on the constructed broadcasting program table, a reception condition of a requested program that is requested by a user, and to output a multimedia contents packet corresponding to the requested program.

9 Claims, 9 Drawing Sheets

| DESTINATION IP | SOURCE IP | VIEWING DETERMINATION | RECEPTION TIME (MILLISECONDS) | MAX RESPONSE TIME (MILLISECONDS) | WAITING TIME (MILLISECONDS) |
|---|---|---|---|---|---|
| 224.111.111.111 | 166.104.123.134 | 0 | 65000 | 65500 | 500 |
| 224.222.222.222 | 219.178.52.3 | 0 | 18000 | 18000 | 18500 |
| 224.33.33.33 | 211.114.74.211 | 1 | 1200 | 0 | 500 |
| ..... | ..... | ..... | ..... | ..... | ..... |
| | | | | | |

FIG. 5

| DESTINATION IP | SOURCE IP | VIEWING DETERMINATION | RECEPTION TIME (MILLISECONDS) | MAX RESPONSE TIME (MILLISECONDS) | WAITING TIME (MILLISECONDS) |
|---|---|---|---|---|---|
| 224.111.111.111 | 166.104.123.134 | 0 | 65000 | 65500 | 500 |
| 224.222.222.222 | 219.178.52.3 | 0 | 18000 | 18000 | 18500 |
| 224.33.33.33 | 211.114.74.211 | 1 | 1200 | 0 | 500 |
| ..... | ..... | ..... | ..... | ..... | ..... |

SYSTEM AND METHOD OF INTERNET GROUP MANAGEMENT FOR MULTICAST PUSH IN PASSIVE ACCESS NETWORKS

TECHNICAL FIELD

Example embodiments of the present invention relate to an Internet group management system and method with respect to a push-type multicast stream that is inputted into a user's terminal in a passive access network.

BACKGROUND ART

Recently, various access network technologies that may accept various multimedia services, such as a rapidly increasing Internet protocol television (IPTV) and video on demand (VOD) service, and Internet service, applications, and the like, and that may provide a quality of service-guaranteed broadband service, have been developed. An access network may be constructed as a switching network based on an active device requiring a power supply or may be constructed as a passive sharing network based on a passive device. Generally, the switching network is a network that divides and classifies a broadcast domain of downstream data into a predetermined output interface and forwards the same, based on an active device, such as a router and a switch. The passive sharing network is a network where the all data is broadcasted downstream. However, although the switching network based on the active device is used, all inputted data is forwarded to all output ports, since the broadcast domain is not divided in a network where a device such as a dummy hub, several digital subscriber line access multiplexers (DSLAMs) that have no ability to interpret an Internet group management protocol (IGMP), and the like. Accordingly, a network under the described environment may also be the passive sharing network.

As an example, among current access network technologies for providing a broadband service, a passive optical network technology (PON) that has economical advantage by using a simple passive device has been dramatically developed.

FIG. 1 is a diagram illustrating an example of a conventional passive access network.

Referring to FIG. 1, a PON is a point-to-multipoint passive network where a single optical line terminal (OLT) 10 accesses multi-optical network terminals (ONT) 30. That is, the single OLT 10 accesses the multiple ONTs 30 by using a plurality of passive splitters 50, thereby sharing a bandwidth of a broad network. Accordingly, a cost for supplying a power may not be expended since a passive device is only used between the OLT 10 and the ONT 30, and a reliability of a network operation may increase since an electronic component is not used. Also, an upgrade of the network or establishment of additional networking may be simple, and an installation space in a central office (CO) or in a point of presence (POP) may be reduced since a plurality of subscribers may be accepted by installing the single OLT 10.

A multicast may simultaneously transmit a single broadcasting stream data to a plurality of subscribers included in the same group. In other words, the single broadcasting stream is transmitted to a multicast router 90 from a server 70 operated by an broadcasting operator in a similar manner as a conventional broadcasting scheme, and copied contents is transmitted, from the multicast router 90, only to subscribers in a group including a viewer requesting the broadcasting stream, namely, only to a corresponding user terminals, by using an IGMP, and thus, the bandwidth is effectively used.

When a multicast packet is received, the multicast router 90 may perform flooding of the multicast packet according to a multicasting forward entry that is generated by a multicast routing protocol. Here, the flooding is transmitting a single packet received from an upper node to other terminals connected to the multicast router 90 or advertising corrected routing information corresponding to every neighbor node in a large-scaled network.

The IGMP is constituted by a membership query message and a membership report message, and multicast routers 90 may transmit a general query to a destination, "224.0.0.1", to ascertain a group of subscribers accessing the corresponding router. The subscribers may transmit the membership report message in response to the membership query message received from the multicast router 90, thereby responding to the corresponding query. Also, a group-specific query or a group-and-source-specific query is a query to inquire about whether another participant exists in the corresponding group, when the multicast router 90 receives an IGMP leave report with respect to a specific group. An IGMP snooping protocol may sense an IGMP protocol packet exchanged between the multicast router 90 and the terminal, and may enable the multicast router 90 to recognize an adjacent port based on a media access control (MAC) address of each port.

In the access network, a plurality of users share the same network resource. Particularly, when the passive device is used, downstream data is broadcasted to all users, without being switched. Accordingly, when a multicast push-type service is provided based on the passive access network, every subscriber accessing the same service node may receive both a requested broadcasting program and unrequested broadcasting program. That is, when a subscriber views a specific broadcasting program, other subscribers accessing the same service node may receive the corresponding program. However, the conventional IGMP group management method has a problem where only a group that explicitly joins by directly sending a join message is recognized. Accordingly, although a user's terminal receives a broadcasting program requested by another user, the user may not view the corresponding program immediately. Also, there is an inefficiency that an explicit IGMP join report is always transmitted to the multicast router to view the broadcasting program currently received, and there is a problem that the user experiences a delay time where the procedure is performed, to view the requested program.

DISCLOSURE OF INVENTION

Technical Goals

An aspect of the present invention provides an Internet group management system and method of a push-type multicast that constructs a broadcasting program table by using information of a contents transmission multicast packet in a user's terminal, and compares a program requested by the user with the broadcasting program table to enable the user to directly view the requested program.

Technical Solutions

According to an aspect of the present invention, there is provided an Internet group management system of a push-type multicast supporting Internet group management with respect to a packet stream simultaneously being transmitted to a subscriber accessing the same node via a passive access network where at least one subscriber accesses a single node, the system including an input packet classifying unit to sort a multimedia contents packet corresponding to a contents transmission packet from the packet stream, and a program managing unit to construct a broadcasting program table having information of the sorted multimedia contents packet, to determine, based on the constructed broadcasting program table, a reception condition of a requested program that is requested by a user, and to output a multimedia contents packet corresponding to the requested program.

Also, the program managing unit performs skipping an IGMP join report procedure with respect to the requested program and immediately outputting the requested program, when the requested program exists in the broadcasting program table, and controlling an IGMP join report with respect to the requested program to be generated, when the requested program does not exist.

Also, the input packet classifying unit receives an IGMP group-specific query or a group-and-source specific query with respect to the requested program, and the program managing unit controls an IGMP join report with respect to the requested program when the IGMP group-specific query or the group-and-source specific query is received.

According to an aspect of the present invention, there is provided an Internet group management method of a push-type multicast supporting Internet group management with respect to a packet stream simultaneously being transmitted to a subscriber accessing the same node via a passive access network where at least one subscriber accesses a single node, the method including sorting, by an input classifying unit, a multimedia contents packet corresponding to a content transmission packet from the packet stream, constructing, by a program managing unit, a broadcasting program table having information of the sorted multimedia contents packet, and determining, by the program managing unit, a reception condition of a requested program that is requested by a user based on the constructed broadcasting program table, and outputting a multimedia contents packet corresponding to the requested program.

Also, the outputting of the multimedia contents packet corresponding to the requested program includes skipping an IGMP join report procedure with respect to the requested program and immediately outputting the requested program, when the requested program exists in the broadcasting program table, and controlling an IGMP join report with respect to the requested program to be generated, when the requested program does not exist Also, the Internet group management method of the push-type multicast further includes receiving, the input packet classifying unit, an IGMP group-specific query or a group-and-source specific query with respect to the requested program, and controlling, by the program managing unit, an IGMP join report with respect to the requested program when the IGMP group-specific query or the group-and-source specific query is received.

Advantageous Effect

According to an example embodiment, a packet stream inputted into a user's terminal is classified into a multicast packet for contents transmission and a multicast packet for an IGMP group-specific query or a group-and-source-specific query, based on a destination IP address for each packet, and a program table is constructed by obtaining a multicast address that is a destination IP address and a source address that is a transmission area IP address from the classified multicast packet for transmission, thereby providing the requested program swiftly so that the user immediately views a program when the user checks whether a corresponding program is received based on the program table, and receives the requested program.

According to an example embodiment, although a viewer views a program without sending an explicit IGMP join report with respect to the program, the viewer may immediately send the IGMP join report when a group-specific query or a group-and-source-specific query with respect to the corresponding program is received, thereby reducing inefficiency of a conventional method that transmits the IGMP join report whenever it is requested in a push-type multicast scheme of a passive access network and improving an efficiency of the network and system operation.

BRIEF DESCRIPTION OF DRAWINGS

FIG. 5 is a diagram illustrating a data structure of a broadcasting program table according to an example embodiment of the present invention;

BEST MODE FOR CARRYING OUT THE INVENTION

Figure 1:
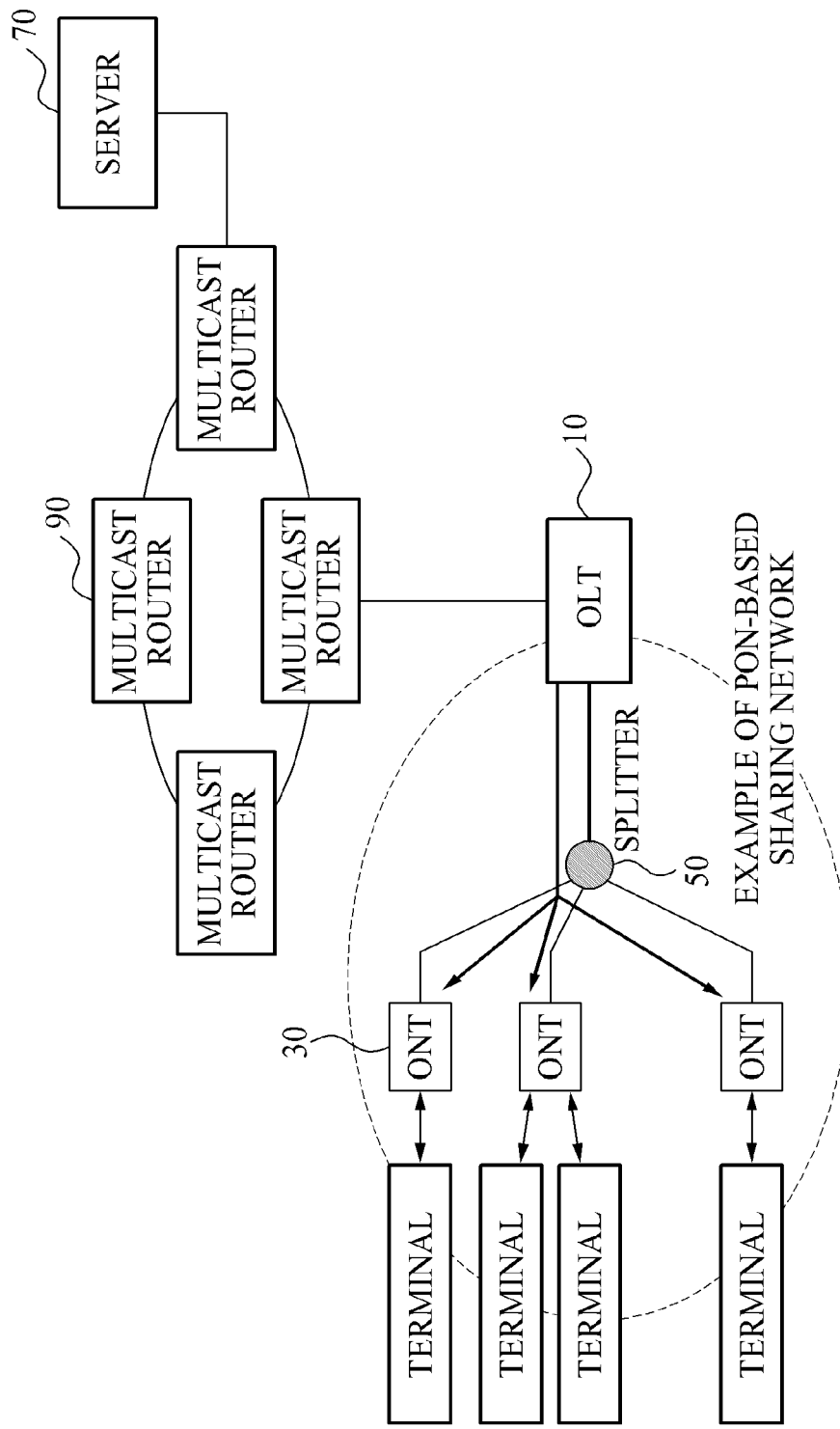
FIG. 1 is a diagram illustrating an example of a conventional passive access network.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
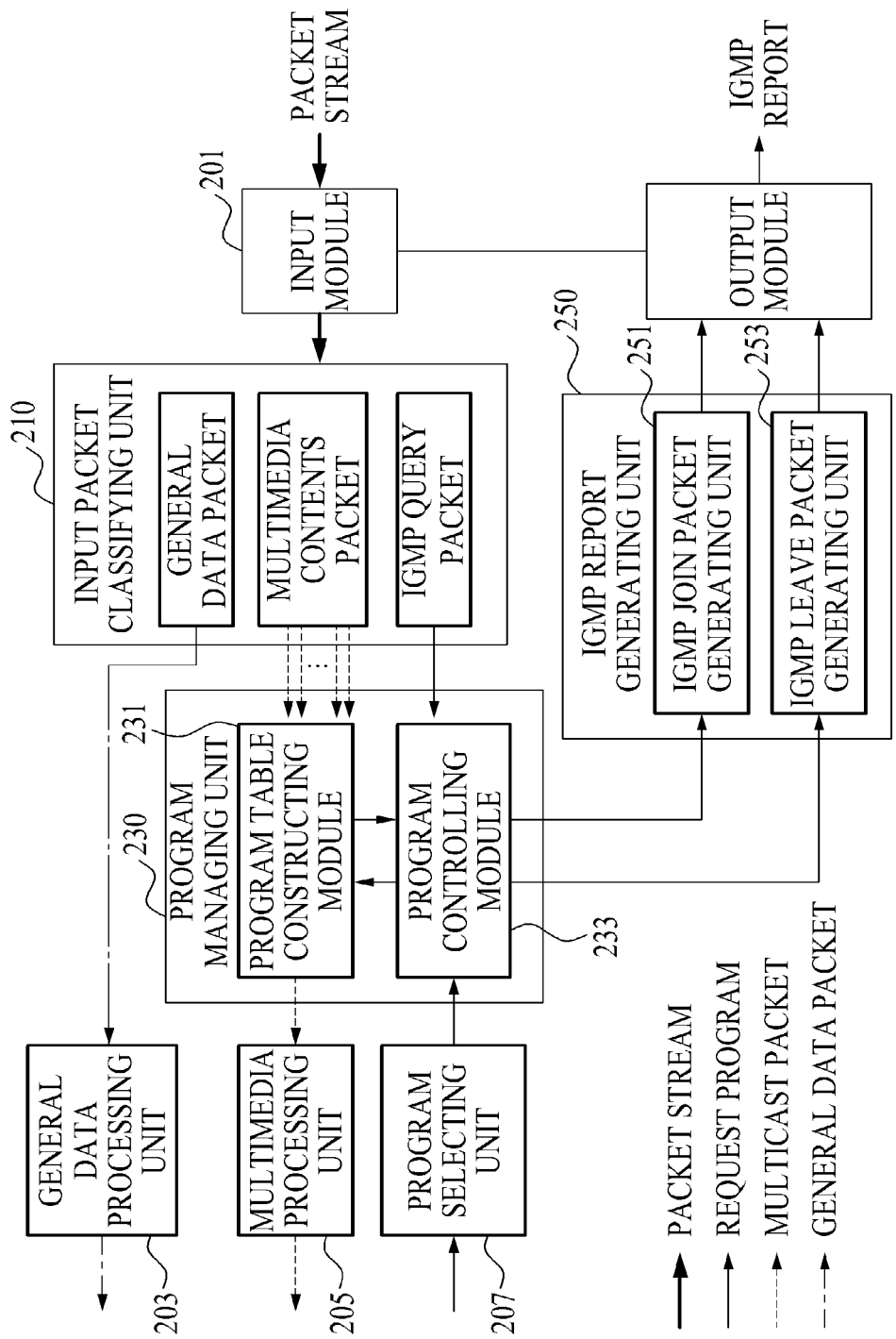
FIG. 2 is a diagram illustrating an internal configuration of an Internet group management system of a push-type multicast according to an example embodiment of the present invention.

FIG. 2 is a diagram illustrating an internal configuration of an Internet group management system of a push-type multicast according to an example embodiment of the present invention.

Referring to FIG. 2, the Internet group management system of the push-type multicast according to an example embodiment of the present invention includes an input packet classifying unit 210, a program managing unit 230, and an IGMP report generating unit 250.

The input packet classifying unit 210 performs first classification of a packet stream into a general data packet and a multicast packet, the packet stream being inputted to a user terminal from a service transmitting end in the passive access network, and classifies the first classified multicast packet into a multicast packet (hereinafter, multimedia contents packet) for a contents transmission and a multicast packet (hereinafter, IGMP query packet) for an IGMP query.

Here, the user terminal includes all terminals that are capable of receiving multimedia contents through the passive access network, for example, an IPTV, a smart TV, a portable terminal using a wireless Internet network, or the like.

The program managing unit 230 may construct a broadcasting program table by using information of the classified multimedia contents packet, and may respond to an IGMP query packet, namely, the multicast packet for the IGMP query forwarded from a multicast router which is the service transmitting end. The program managing unit 230 may include a program table constructing module 231 to construct a broadcasting program table and a program controlling module 233 to respond to the IGMP query packet based on the broadcasting program table.

The IGMP report generating unit 250 performs generating of a desired IGMP report, such as a join report, a leave report, and the like by comparing a program requested by a user with the constructed broadcasting program table, and performs generating of a desired IGMP report based on a response to the IGMP query packet. The IGMP report generating unit 250 may include an IGMP join packet generating unit 250 to generate an IGMP join report and an IGMP leave packet generating unit 253 to generate an IGMP leave report.

Figure 3:
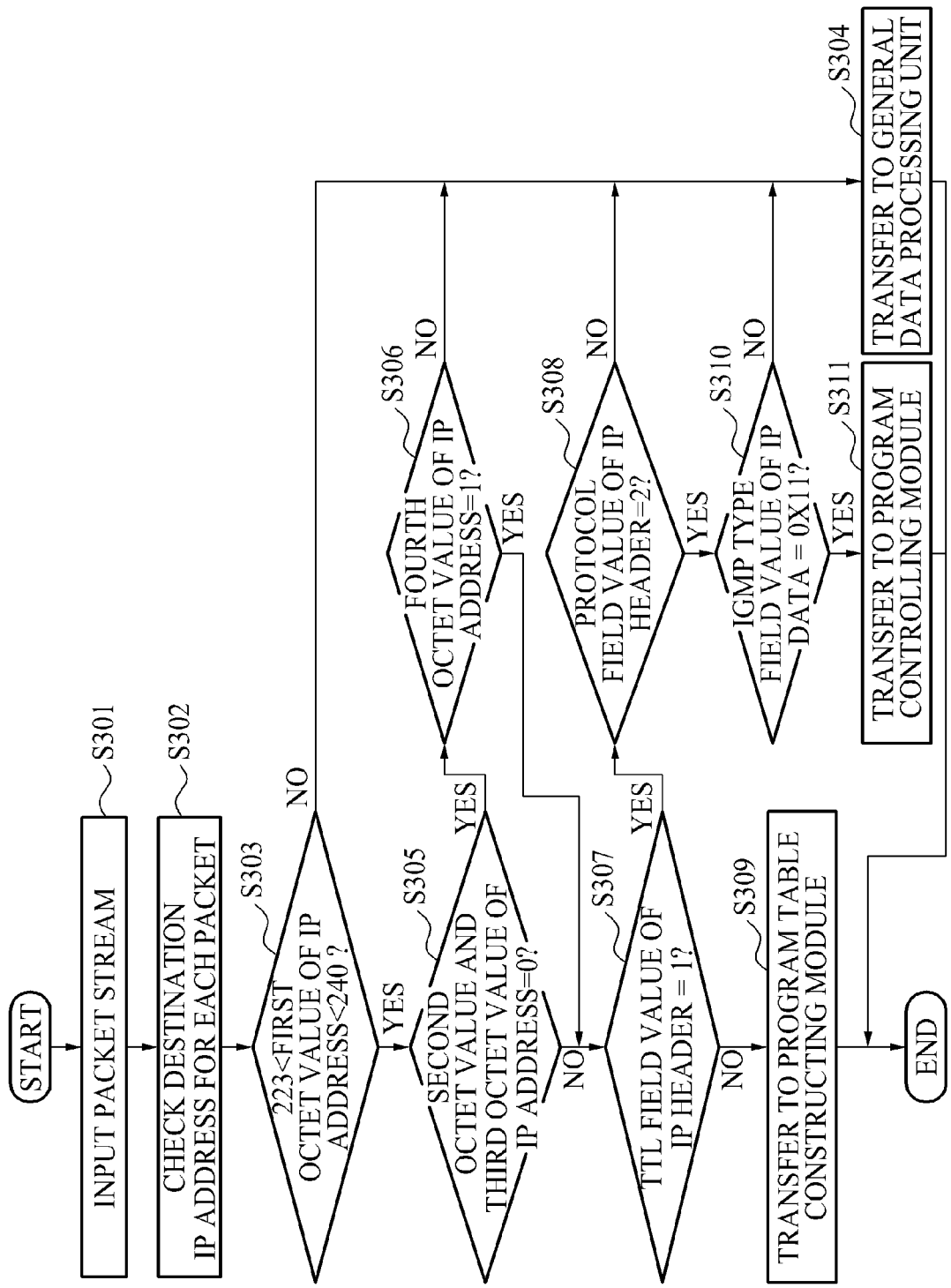
FIG. 3 is a diagram illustrating a process of classifying a packet stream according to an example embodiment of the present invention.

Referring to FIG. 3, a process that an input packet classifying unit 210 classifies a packet stream according to an example embodiment of the present invention will be described in detail.

Figure 4:
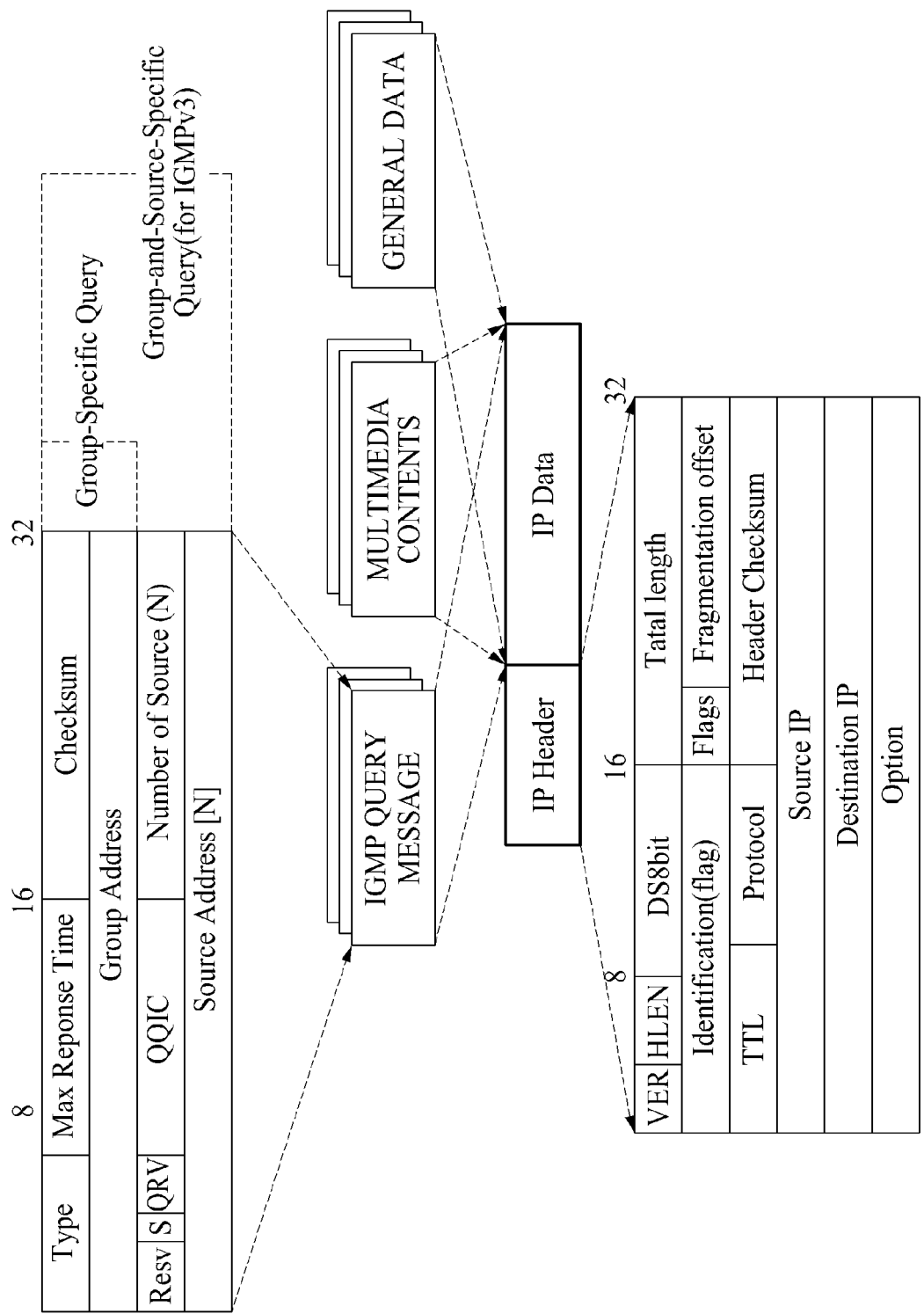
FIG. 4 is a diagram illustrating a data structure of a packet stream.

The input packet classifying unit 210 receives a packet stream inputted through an input module 201 of a terminal in operation S301. Referring to FIG. 4, the packet stream is constituted by IP data including a general packet, a multimedia content packet, and an IGMP query packet, and an IP header including a destination IP address.

The input packet classifying unit 210 may check each octet of a destination IP address and a specific field value of the IP header in the packet stream in operation S302, and may classify the IP data into the general data, the multimedia contents packet, and the IGMP query packet.

A multicast IP of an IPv4 address system is D-class (224.0.0.0~239.255.255.255), and the first four bits of a top level octet is assigned as "1110". Also, although the first eight bits begins with "0xFF" in a multicast address of the IPv4 address system, the present example embodiment will be described by using the multicast address in IPv4 format.

In detail, the input packet classifying unit 210 may classify the corresponding packet as the general data packet in operation S303 when a top level octet value of the destination IP address is greater than or equal to "240" and less than or equal to "223", and may forward the classified general data packet to a general data processing unit 203 in operation S304. Also, the input packet classifying unit 210 may classify the corresponding packet as the multimedia contents packet or the IGMP query packet when the top level octet value of the destination IP address is greater than "223" and less than "240". That is, the packet stream is classified into the general data packet and the multicast packet based on whether a condition that the top level octet value of the destination IP address is greater than "223" and less than "240" is satisfied.

Other multicast packets sorted from the general data packet may include the multimedia contents packet (224.0.1.0~239.255.255.255), the IGMP query packet (general query: 224.0.01, group-specific query or group-and-source-specific query: corresponding multicast address), and packets using a reserved address (a value between 224.0.0.2 and 224.0.0.255) for a specific protocol.

The input packet classifying unit 210 may check a second octet value through a fourth octet value of the destination IP address in operations S305 and S306 to reclassify the classified multicast packets sorted from the general data packet based on their use. In this instance, when both the second octet value and the third octet value of the destination IP address are "0", and the fourth octet value of the destination IP address is "1", the corresponding packet is forwarded to the program controlling module 233 of the program managing unit 230 in operation S311 since the corresponding packet is the IGMP query packet. Here, the multicast packet of which a fourth octet value is not "1" is a packet that used by a specific protocol, and thus, the corresponding packet is classified as the general data packet and is forwarded to the general data processing unit 203 in operation S304.

Next, remaining packets are the multimedia contents packets and the IGMP query packets for a specific-group query or group-and-source-specific query. Here, when a multicast router receives an IGMP leave report with respect to a specific group, the specific-group query or group-and-source-specific query is a query that queries about whether another participant exists in the corresponding group. Particularly, unlike the IGMP general query that inquires to all host (destination address: 224.0.0.1) in the network, the IGMP query packet for the group-specific query or the group-and-source-specific query is forwarded using a multicast address of the corresponding group as the destination IP address. Also, a time to live (TTL) field value of an IP header is set to "1" and a protocol filed value is set to "2" with respect to all IGMP query packets. Accordingly, the input packet classifying unit 210 checks a TTL field value in an IP header of a corresponding packet to reclassify the remaining packets into the multimedia contents packet or an IGMP query packets for the group-specific query or the group-and-source-specific query in operation S307. In this instance, when the value of the TTL field is not "1", the corresponding packet is the multimedia contents packet, and thus, the input packet classifying unit 210 forwards the corresponding packet to the program table constructing module 231 of the program managing unit 230 in operation S309. Also, when the value of the TTL value is "1", the input packet classifying unit 210 checks whether a protocol field value of the IP header of the packet is "2" in operation S308. When the protocol field value of the IP header is "2", whether a type field value of an IGMP frame inserted into an IP data area is identical to "0x11" that explicitly indicates a membership query is checked in operation S310. When the protocol field value of the IP header is "2" and the type field value of the IGMP frame inserted into the IP data area is identical to "0x11", the corresponding packet is classified as the IGMP query packet for the group-specific query or the group-and-source-specific query, and is forwarded to a program controlling module 233 of the program managing unit 230 in operation S311.

A process that a program managing unit 230 constructs a broadcasting program table according to an exemplary embodiment of the present invention will be described with reference to FIG. 5. Here, the process of constructing of the broadcasting program table may be performed by the program table constructing module 231 of the program managing unit 230.

When a multimedia contents packet for contents transmission is received, the program table constructing module 231 may obtain a multicast address that is a destination address of the corresponding packet and a source address that is a transmission area address, and may construct the broadcasting program table.

Also, the program table constructing module 231 constructs the broadcasting table based on a viewing determination field indicating a program that a user currently views, a reception time field indicating a reception time of the broadcasting program, a max response time field indicating a maximum response time with respect to a broadcasting program having an IGMP specific-group query or a specific-group-and-source query, and a waiting time field indicating a continuity of the broadcasting program. Here, the viewing determination field value is expressed as one bit, and when the user is viewing, the viewing determination field value may be set as "1", and when the user is not viewing, the viewing determination field value may be set as "0". Also, the program table constructing module 231 counts time based on a millisecond unit from when the program is received, and the reception time field may include the counted reception time. Also, the max response time field is constructed by adding a max response time field value of an IGMP frame inserted into an IP data area of an IGMP query packet for a group-specific query or a group-and-source-specific query that is received from the program controlling module 233 to the reception time field value on the broadcasting program table. Also, an initial value of the maximum response time is "0", and the maximum response time is updated whenever a new value with respect to the IGMP group-specific query or group-and-source-specific query is received from the program controlling module 233. Also, when a program receives the IGMP group-specific query or group-and-source-specific query and sets a maximum response time with respect to the program. However, when the viewing determination value is maintained as "0" while the reception time becomes identical to the maximum response time, an arbitrary waiting time is allocated. That is, the waiting time field is to prevent the user from directly viewing a broadcasting program that does not directly join to the IGMP group-specific query or group-and-source-specific query, until a continuity of the broadcasting program is determined. Also, an initial value of the waiting time field may be changed according to a service operation, to enable the user to view the broadcasting program after booting up a terminal and checking continuities of the broadcasting programs on a program table.

The program table constructing module 231 may forward the broadcasting program table constructed as shown in FIG. 5 to the multimedia processing unit 205 when there is a broadcasting program request from a user. In this instance, the multimedia processing unit 205 may provide the broadcasting program table to a screen, thereby enabling the user to check information about whether a broadcasting program is currently received, a reception time of the broadcasting program, a maximum response time with respect to an IGMP group-specific query or a group-and-source-specific query, and a reception waiting time.

Hereinafter, a process where the program managing unit 230 joins an IGMP will be described in detail. Here, an IGMP join process may be performed by the program controlling module 233 of the program managing unit 230.

The program controlling module 233 may receive an IGMP query packet from an input packet classifying unit 210. When the received packet is an IGMP query packet for a general query, to perform a join report with respect to a broadcasting program of which a viewing determination value is "1" by using the broadcasting program table, the program controlling module 233 may forward information of the corresponding program to an IGMP join packet generating unit 251 to enable the IGMP report generating unit 250 to generate an IGMP join report.

Also, when the received packet is an IGMP query packet for a group-specific query or a group-and-source-specific query, the program controlling module 233 may determine, based on the broadcasting program table, whether a broadcasting program that uses a multicast address of the corresponding query is currently viewed. In this instance, when the user views the corresponding program, the program controlling module 233 may forward information of the corresponding program to the IGMP join packet generating unit 251 to enable the IGMP report generating unit 250 to generate the IGMP join report, and when the user does not view the corresponding program, the program controlling module 233 may forward the received IGMP group-specific query or the group-and-source-specific query to the program table constructing module 231 to construct a max response time field in the broadcasting program table. In this instance, responding to the corresponding IGMP group-specific query or the group-and-source-specific query is not performed. Accordingly, a multicast router may leave the corresponding group, when a response is not received within a maximum response time of the IGMP group-specific query or the group-and-source-specific query.

A process where the program managing unit 230 requests the broadcasting program according to an example embodiment of the present invention will be described with reference to FIG. 7. Here, the broadcasting program requesting process may be performed by the program controlling module 233 of the program managing unit 230.

First, a broadcasting program requesting section will be described.

Figure 6:
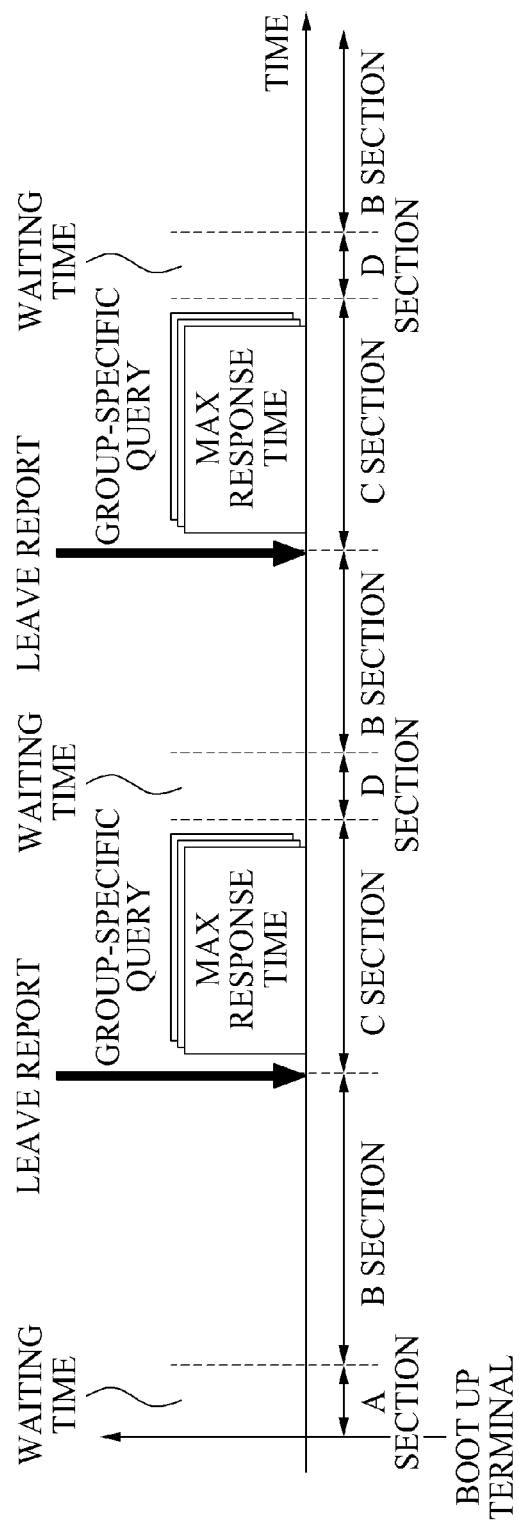
FIG. 6 is a diagram illustrating a broadcasting program request section according to an example embodiment of the present invention.

Referring to FIG. 6, a section A is immediately after a terminal is booted up or immediately after a new broadcasting program is received. During the section A, a broadcasting program table is not yet completed and a continuity of the received program is not yet determined. Accordingly, an initial waiting time is set with respect to all broadcasting programs in the broadcasting program table. Also, a section B is a section where a reception time value is greater than a maximum response time value and a waiting time value in the broadcasting program table, and a user directly views a corresponding broadcasting program without an explicit IGMP join during the section B. Also, a section C is a section where the reception time value is less than the maximum response time value in the broadcasting program table, a group join according to an IGMP group-specific query or group-and-source-specific query has to be checked during to section C. Accordingly, after performing the explicit IGMP join, the user directly views the corresponding program. Also, a section D is a section where the reception time value is less than the waiting time value in the broadcasting program table, and a continuity of the broadcasting program is not determined in the section D since an explicit IGMP join report is not transmitted in the previous section C. Accordingly, after performing the explicit IGMP joining and having a corresponding waiting time, the user is able to view the program.

Figure 7:
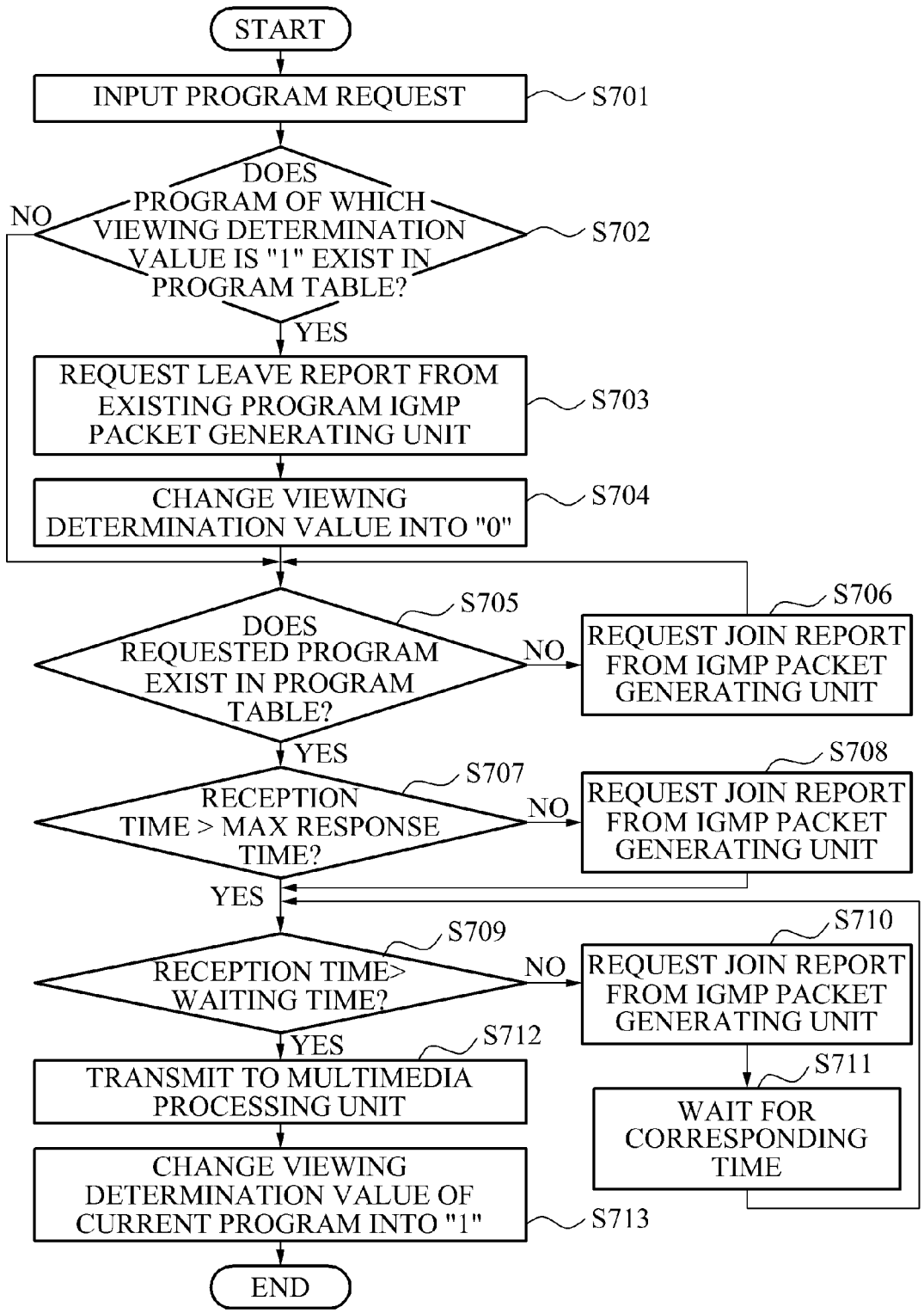
FIG. 7 is a flowchart illustrating a process of requesting a broadcasting program requested by a user according to an example embodiment of the present invention.

As illustrated in FIG. 7, the program controlling module 233 receives a broadcasting program requested by a user (hereinafter, requested broadcasting program) from the program selecting unit 207 in operation S701. Performances of the program controlling module 233 may be classified into two schemes based on whether the user views a different broadcasting program.

First, the program controlling module 233 determines that the user currently views a different broadcasting program when at least one of viewing determination field values on the broadcasting program table is "1" in operation S702. That is, the program controlling module 233 may determine that the user requests switching the different broadcasting program that the user currently views into a new program broadcasting program. Accordingly, the program controlling module 233 may forward, to an IGMP leave packet generating unit 253 of the IGMP report generating unit 250, information of the program that is viewed in operation S703, to directly generate an IGMP leave report with respect to the program that is viewed. Also, the program controlling module 233 may change a viewing determination value of the broadcasting program that is viewed to "0" on the broadcasting program table in operation S704.

Second, the program controlling module 223 determines that the user does not view the different broadcasting program when viewing determination values are all "0" in operation S702. That is, the program controlling module 233 determines that a broadcasting program is requested as a first time immediately after the terminal is booted up.

The program controlling module 233 determines whether the requested broadcasting program exists in the program table in operation S705, after performing the two processes based on the viewing determination field value. Here, when the requested program broadcasting program does not exist in the broadcasting program table, the program controlling module 233 may forward information of the requested broadcasting program to the IGMP join packet generating unit 251 of the IGMP report generating unit 250 to generate an IGMP join report with respect to the request broadcasting program in operation S706.

Also, when the requested broadcasting program exists in the broadcasting program table, the program controlling module 233 compares a reception time field of the requested broadcasting program with a maximum response time in operation S707. In this instance, when the max response time field value is greater than the reception time field value, namely, it is a section where an IGMP group-specific query or a group-and-source-specific query is requested, the program controlling module forwards the information of the requested broadcasting program to the IGMP join packet generating unit 251 of the IGMP report generating unit 250 to generate the IGMP join report in operation S708.

Also, when the reception time field value is greater than the reception time field value, the program controlling module 233 compares the reception time value with a waiting time field value on the broadcasting program table in operation S709. Here, when the waiting time field value is greater than the reception time field value, the program controlling module 233 determines that a broadcasting program that is not directly join in the IGMP group-specific query or the group-and-source-specific query is requested, and thus, forwards the information of the requested broadcasting program to the IGMP join packet generating unit 251 of the IGMP report generating unit 250 in operation S710, and may wait for a time corresponding to the waiting time field value in operation S711.

Also, when the reception time value is greater than waiting time field value, the program controlling module 233 may forward the requested broadcasting program to the multimedia processing unit 205 in operation S712 to enable the user to skip an IGMP join report process and to directly view the requested broadcasting program, and may change the viewing determination field value of the requested broadcasting program on the broadcasting program table into "1" in operation S713.

An Internet group management method of a push-type multicast according to an example embodiment of the present invention will be described in detail with reference to FIGS. 8 and 9.

Figure 8:
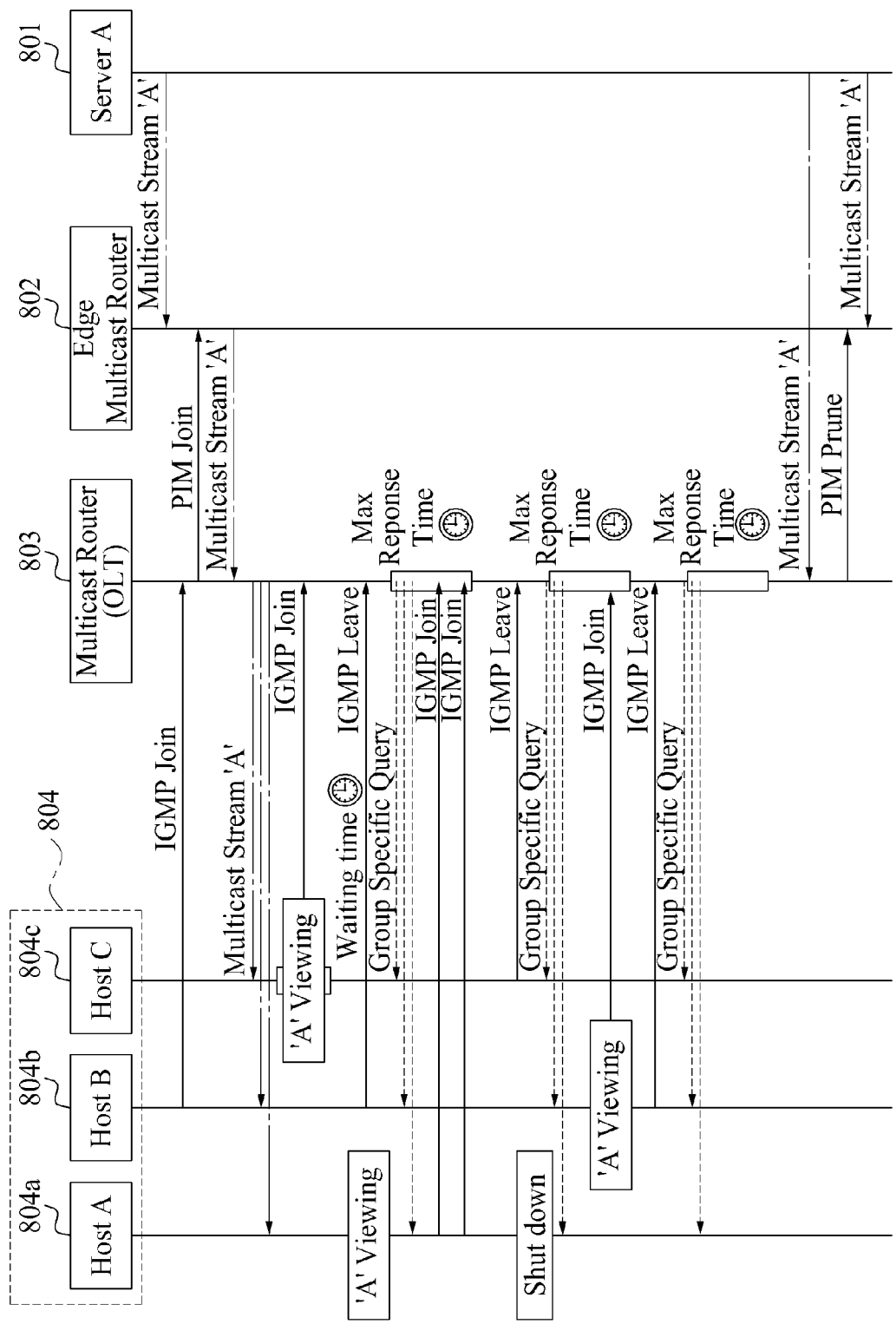
FIGS. 8 and 9 are time-based sequence diagrams illustrating an Internet group management scheme according to an example embodiment of the present invention.
Figure 9:
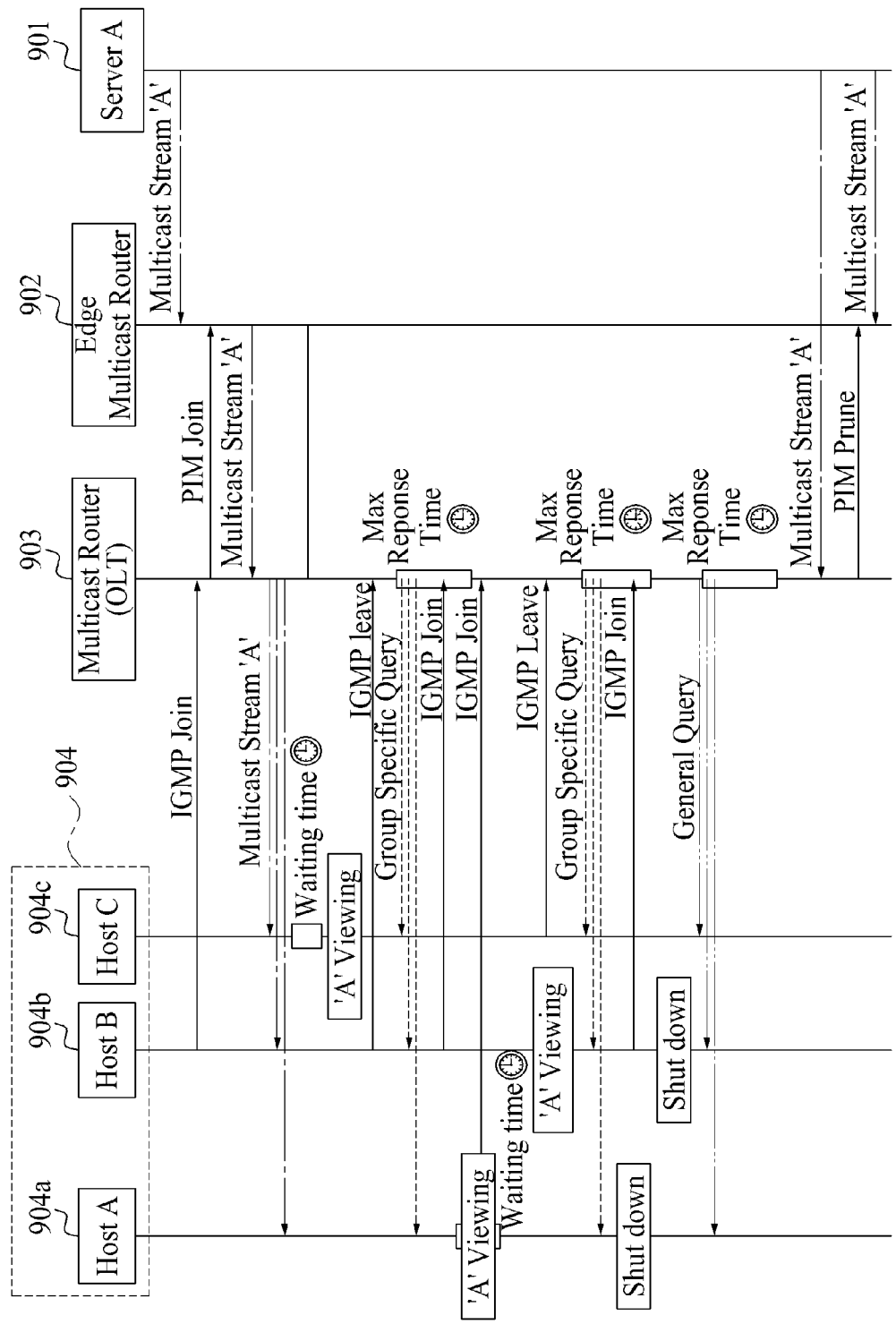

FIGS. 8 and 9 are time-based sequence diagrams illustrating an Internet group management scheme in an Internet group management system of a push-type multicast according to an example embodiment of the present invention. Here, it is assumed that a server 801 or 901 to transmit a broadcasting program, an edge multicast router 802 or 902 to connect a transport network and an access network, and a multicast router (hereinafter, OLT) 803 or 903 to forward an broadcasting program to hosts 804, namely, subscriber terminals, according to a multicast routing protocol in an access network are included as component devices.

Referring to FIG. 8, the server 801 may transmit the broadcasting program (hereinafter, stream A) based on a multicast scheme. The edge multicast router 802 may receive the stream A via a network. In this instance, a host B 804*b* of subscriber terminals forwards an IGMP join report to an OLT 803 to view the stream A. The OLT 803 may receive the stream A by requesting the stream A from the edge multicast router 802 according to a multicast routing protocol (protocol independent multicast (PIM)). Subsequently, since a network between the OLT 803 and the host 804 is a passive access network, the stream A requested by the host B 804*b* may be forwarded to a host A 804*a* and a host C 804*c* existing in the same node. The stream A forwarded to the all hosts 804 existing in the same node may construct a broadcasting program table in an IPTV terminal of each host.

Here, as described in the description with reference to FIG. 6, the broadcasting program table is not yet completed and a continuity of the received program is not yet determined, during a section A which is immediately after a terminal is booted up or immediately after a new broadcasting program is received. Accordingly, a waiting time is set during the A section, and when a program is requested during the waiting time, an explicit IGMP join report has to be forwarded. That is, a process that the host C 804*c* forwards an IGMP join report to view the stream A is included. Next, when the host B 704*b* forwards an IGMP leave report to change a channel, the OLT 803 may transmit an IGMP group-specific query or a group-and-source-specific query.

Also, in a section B of FIG. 6, the host A 804*a* that is viewing the stream A without an explicit IGMP join report and the host C 804*c* that has been previously viewing the stream A may perform the explicit IGMP join report within a maximum response time. Next, when the host A 804*a* is not in a condition of viewing since a terminal of the host A 804*a* that is viewing the stream A is shut down, and also when the host C 804*c* that is a last viewer performs an IGMP leave report with respect to the corresponding program, the OLT 803 may transmit an IGMP group-specific query or a group-and-source-specific query.

Also, during a section C of FIG. 6, the host B 804*b* has to transmit the explicit IGMP join report to view the stream A again, and joins viewing the stream A. Next, when a last viewer of the stream A, namely, the host B 804*b*, performs an IGMP leave report, the OLT 803 transmits an IGMP group-specific query or a group-and-source-specific query, and when the OLT 803 fails to receive an appropriate IGMP join report within a maximum response time, transmits a prune message to the edge multicast router 802 according to a multicast routing protocol, and thus, the OLT 803 no longer receives broadcasting program with respect to the stream A.

Referring to FIG. 9, an Internet group management process with respect to a section D of FIG. 6 and an IGMP general query is illustrated.

Referring to FIG. 9, a section D of FIG. 6 is a section where a continuity of a stream A is not determined since a previous section C does not transmit an explicit IGMP join report. Accordingly, after performing an explicit IGMP join, viewing the corresponding program is possible. That is, a waiting time of a host 904 is always set right after a maximum response time of an OLT 903, and an explicit IGMP join report has to be forwarded to enable the host A 904*a* to view the stream A during the corresponding waiting time. Next, when the host A 904*a* and the host B 904*b* which view the stream A are shut down without an explicit IGMP leave report, the OLT 903 queries whether a viewer of the corresponding program exists, and when the OLT 903 fails to receive an appropriate IGMP join report within the maximum response time, transmits a prune message to the edge multicast 902 according to the multicast routing protocol, and thus, the OLT 803 no longer receives broadcasting program with respect to the stream A.

An example embodiment of the present invention may construct a broadcasting program table in a viewer's terminal by utilizing a fact that a program requested by another viewer existing in the same node is inputted to the viewer's IPTV terminal via a network, thereby enabling the viewer to directly view the broadcasting program existing in the broadcasting program table. Also, an example embodiment of the present invention may transmit an explicit IGMP join report when an IGMP group-specific query or a group-and-source-specific query with respect to a desired broadcasting program is received, thereby improving an IGMP join scheme.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An Internet group management system of a push-type multicast supporting Internet group management with respect to a packet stream simultaneously being transmitted to a subscriber accessing the same node via a passive access network where at least one subscriber accesses a single node, the system comprising:
 an input packet classifying unit to sort a multimedia contents packet corresponding to a contents transmission packet from the packet stream; and
 a program managing unit to construct a broadcasting program table having information of the sorted multimedia contents packet, to determine, based on the constructed broadcasting program table, a reception condition of a requested program that is requested by a user, and to output a multimedia contents packet corresponding to the requested program, wherein the program managing unit performs:
 obtaining a destination IP address corresponding to the multimedia contents packet and a source IP address, and constructing the broadcasting program table; and
 constructing the broadcasting program table by further including a viewing determination field indicating whether a user is currently viewing a broadcasting program corresponding to the multimedia contents packet, a reception time field indicating a reception time of the broadcasting program, a max response time field indicating a maximum response time with respect to a broadcasting program having an IGMP group-specific query or a group-and-source specific query, and a waiting time field indicating a continuity of the broadcasting program.

2. The system of claim 1, wherein the input packet classifying unit checks a top level octet value of a destination IP address in an IP header of the packet stream to sort a multicast packet having a multicast address corresponding to the top level octet value, and checks a time to live (TTL) field value in the IP header to sort the multimedia contents packet from the sorted multicast packet.

3. The system of claim 1, wherein the program managing unit obtains a destination IP address corresponding to the multimedia contents packet and a source IP address, and constructs the broadcasting program table.

4. The system of claim 1, wherein the program managing unit performs:
 skipping an IGMP join report procedure with respect to the requested program and immediately outputting the requested program, when the requested program exists in the broadcasting program table, and
 controlling an IGMP join report with respect to the requested program to be generated, when the requested program does not exist.

5. The system of claim 1, wherein the program managing unit performs:
 determining whether the user is viewing a different broadcasting program based on the viewing determination field; and
 outputting the requested program after controlling an IGMP leave report with respect to the different broadcasting program to be generated, when the user is viewing the different broadcasting program.

6. The system of claim 5, wherein the program managing unit determines whether the requested program exists in the broadcasting program table when the user is not viewing the different broadcasting program, and when the requested program exists in the broadcasting program table, the program managing unit performs:
 outputting the requested program after controlling an IGMP join report with respect to the requested program to be generated, when a value of the max response time field is greater than a value of the reception time field;
 waiting for a time corresponding to the waiting time field after controlling the IGMP join report to be generated, when the value of the reception time field is greater than the max response time field and less than the waiting time field; and
 skipping an IGMP join report procedure and outputting the requested program, when the value of the reception time field is greater than the value of the max response time field and the value of the waiting time field.

7. The system of claim 1, wherein the input packet classifying unit receives an IGMP group-specific query or a group-and-source specific query with respect to the requested program.

8. The system of claim 7, wherein the input packet classifying unit checks a top level octet value of a destination IP address in an IP header of a packet stream corresponding to the requested program to sort a multicast packet having a multicast address corresponding to the top level octet value, and checks a TTL field value in the IP header to sort a packet corresponding to the IGMP group-specific query or a group-and-source specific from the sorted multicast packet.

9. The system of claim 7, wherein the program managing unit controls an IGMP join report with respect to the requested program when the IGMP group-specific query or the group-and-source specific query is received.

* * * * *